UNITED STATES PATENT OFFICE.

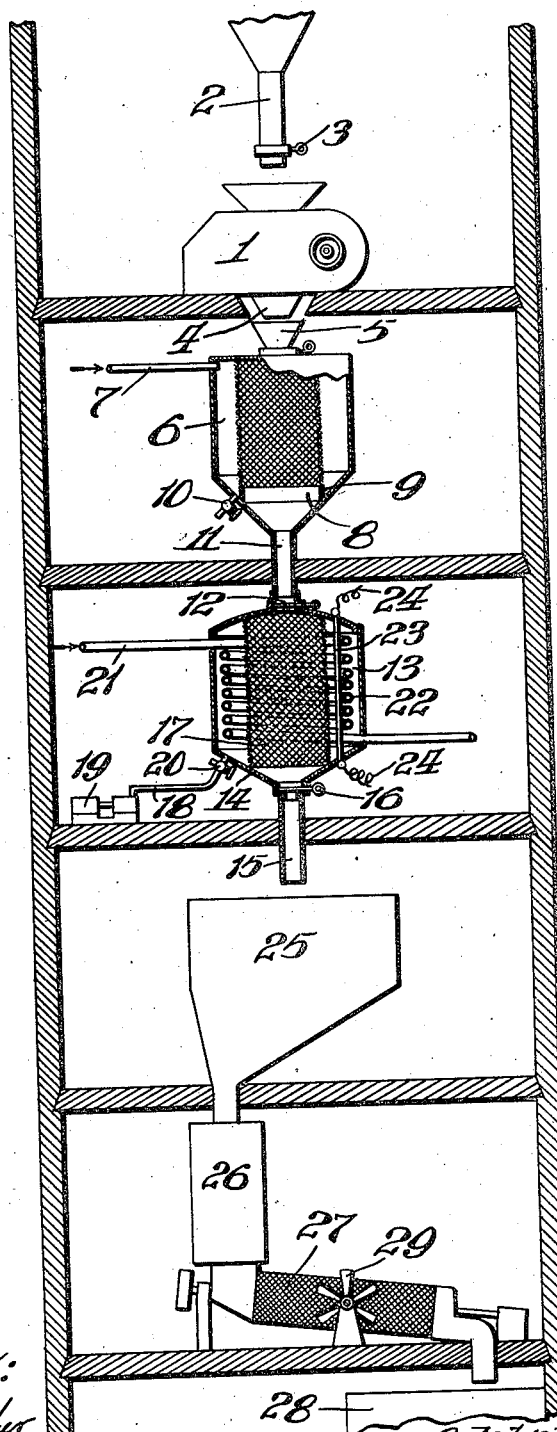

ADOLPH JAEGER, OF JACKSON, MISSOURI, ASSIGNOR OF TWENTY-TWO AND ONE-HALF ONE-HUNDREDTHS TO ARTHUR O. KNIGHT AND TWENTY-TWO AND ONE-HALF ONE-HUNDREDTHS TO HARRY A. KNIGHT, BOTH OF ST. LOUIS, MISSOURI.

PROCESS OF TREATING GRAINS.

1,166,592.

Specification of Letters Patent.    Patented Jan. 4, 1916.

Application filed February 4, 1911. Serial No. 606,463.

*To all whom it may concern:*

Be it known that I, ADOLPH JAEGER, a citizen of the United States, residing at Jackson, in the county of Cape Girardeau and State of Missouri, have invented certain new and useful Improvements in Processes of Treating Grains, of which the following is a specification.

This invention relates to process of treating grain of any kind, being exemplified in the present specification in its application to wheat preliminary to its formation into flour.

The main general object of the invention is to provide an improved process whereby the moisture in the grain may be extracted, onions removed or entirely deodorized and whereby a finer, whiter product my be secured.

Toward the accomplishment of these objects, my invention contemplates the extraction of moisture and pigment-producing oils from the grain by an artificial sweating process which is more rapid, more thorough, and which does not produce any unhealthful effects observed in other methods involving the use of electricity and chemicals in a way which is forbidden by the United States Government.

In processes in vogue at the present day, considerable difficulty has been experienced in the manufacture of fine white flour by reason of the presence in the wheat received at the thresher of ever increasing proportions of wild onions, by which the corrugated milling rolls become clogged, with the result that said rolls are very inefficiently operated. Furthermore, these onions give up an undesirable amount of moisture, besides producing a very decided and undesirable odor which is immediately absorbed by the flour by reason of its high absorbent properties. There is, therefore, at the present time in some sections of the country, large quantities of flour manufactured which are not up to the standard of quality which they should reach. A further difficulty resides in the fact that under present conditions, the large part of the wheat which is sent to the miller, is not subjected to the "sweating" process which in former times it received while lying in the stack. Especially is this the case with winter wheat crops, making it imperative for the miller to immediately subject the wheat to a lengthy drying process involving continuous agitation in a current of air to prevent certain incipient changes which, if they occur, finally result in the discoloration of the flour product.

The drawing represents diagrammatically the construction, and arrangement of parts in a plant for carrying out my improved process in its application to the treatment of wheat.

In this drawing, the grain berries together with the wild onions (sets as well as seeds) are conveyed to a separator 1 by means of a tubular conveyer 2, the discharge from which is controlled by a gate valve 3 of any suitable construction. Said conveyer 2 leads from a source of supply into which the grain, onions, etc., have been dumped in the condition in which they are received from the farmer. In the separator 1, such foreign matter as big pieces of heads, chaff, dust, strings, nails and the like are removed, the grain berries along with the onion seeds being delivered through a funnel 4 into a hopper 5 in the top of a steaming tank 6, to which steam is delivered through a steam pipe 7. Within the steaming tank 6 is disposed a cylindrical screen of wire gauze or the like which extends substantially the entire length of said tank but is provided adjacent the lower end thereof with a closed cylindrical wall 8 to provide a trough 9 for condensed steam which collects at the bottom of the tank, the bottom of said tank being for this purpose contracted as shown, and a drain cock 10 provided for leading off the water of condensation. A tubular conveyer 11 depends from the tank 6 and an airtight gate valve 12 is provided therein for retaining the grain within the tank 6 until the steaming operation has been completed, after which said gate valve 12 is opened to permit the grain to pass downwardly into a vacuum tank 13, which is provided below with a hopper bottom or funnel 14 having a discharge outlet 15 below controlled by an air-tight gate valve 16. Within the vacuum tank 13 is a wire mesh cylindrical screen 17 within which the grain and onion berries are held. In order to provide means for producing a vacuum within the tank 13 a pipe 18 connects said tank with a pumping engine 19, said pipe being controlled by a three-way valve 20 whereby when the tank 13 is closed to said pipe, air may be admitted to the engine 19 to ease the load thereon. Suitable means for heating the grain and onions within the screen 17 may be provided by a steam or hot water pipe 21 which is preferably formed into a coil 22 within the tank 13 around the screen 17. In order to facilitate the bleaching action which takes place within the vacuum chamber 13, any means for producing strong lighting effects may be disposed about the screen 17, such apparatus being represented at 23 as receiving power by electric wires 24. After the grain and berries have been subjected to this dehydrating bleaching action, the mass may be discharged into a stock hopper 25 which discharges in turn into a scrubbing mill 26 of any suitable well known construction, after which it passes into a scouring or brush machine 27 to be discharged downwardly into a stock hopper 28 from which the dehydrated, bleached and scoured grain berries may be conveyed to the grinding rolls (not shown on the drawings).

As the mixed onions and grain berries pass downwardly from the tanks 6 and 13, the successive treatments by steam and vacuum thoroughly deodorize the onions, while the vacuum makes the onions perfectly dry and very frangible. The result is that when the mass of grain and onions is passed through the scrubbing and scouring machines, the onions are broken up into fine particles and removed by fans. While the onions may not be totally eliminated in this manner, what small proportion thereof remains in the mass will be thoroughly deodorized and produce no appreciable effect upon the final product of flour. As a result, the grain berries delivered to the corrugated rolls will be perfectly dry and free from foreign matter which clogs the rolls, and moreover there will be no odor-producing agency in the mass. Furthermore, I have ascertained that the preliminary bleaching of the grain berries which is secured by their passage through the steam and vacuum tanks, produces a fine white flour after the grain berries have been ground in the rolls, such flour being fully as white as that produced by chemical means by heretofore forbidden methods.

The apparatus whereby the hereinbefore described process is carried out, is claimed in my co-pending application, Serial Number 644,794, which was filed upon August 18, 1911.

What I claim is:

1. The process of treating grain adulterated with onions which consists in dehydrating the mass in a vacuum before the onions are broken, and in subsequently breaking up and removing the dried onions.

2. The process of treating grain which consists in subjecting the grain to a vacuum and in heating said grain while in the vacuum without introducing a vacuum-breaking medium.

3. The process consisting in subjecting a mass of grain adulterated with wild onions to a steaming action and in subsequently dehydrating the mass in a vacuum until the onions are deodorized.

4. The process consisting in subjecting a mass of soil products adulterated with odoriferous impurities to dehydration in a vacuum until said impurities are deodorized.

5. The process consisting in subjecting a mass of soil products adulterated with injurious volatile portions to dehydration in a vacuum until said impurities are eliminated from the mass.

6. The process of treating grain which consists in dehydrating grain berries in a vacuum in the presence of a bleaching light, before grinding said bleached grain berries.

7. The process of treating grain adulterated with onions which consists in subjecting the mass in the form in which it is received from the fields to dehydration in a vacuum, and in removing the dried onions subsequent to the dehydration of said mass.

8. The process of treating grain which consists in steaming the unhulled grain to render the hulls thereof pervious and subquently subjecting said unhulled grain to a dry heat in a vacuum to expel the volatile constituents and subsequently thereto, to render said hulls impervious.

9. The process of treating grain which consists in steaming the grain berries to render the hulls thereof pervious and for diluting the color giving constituents within the berries, and in dehydrating said grain berries in the presence of a bleaching light.

10. The process of treating grain which consists in steaming the grain berries to render the hulls thereof pervious and for diluting the color giving constituents within the berries and in dehydrating said grain berries in a vacuum in the presence of a bleaching light.

ADOLPH JAEGER.

In the presence of—
J. B. MEGOWN,
H. G. FLETCHER.